United States Patent [19]
Grantz

[11] Patent Number: 5,980,113
[45] Date of Patent: Nov. 9, 1999

[54] ASYMMETRIC SEALING MEANS FOR FLUID DYNAMIC BEARINGS

[75] Inventor: Alan Lyndon Grantz, Aptos, Calif.

[73] Assignee: Seagate Technology, Inc., Scotts Valley, Calif.

[21] Appl. No.: 09/060,224

[22] Filed: Apr. 14, 1998

Related U.S. Application Data

[63] Continuation-in-part of application No. 08/994,099, Dec. 19, 1997
[60] Provisional application No. 60/064,590, Nov. 6, 1997.

[51] Int. Cl.[6] .................................................... F16C 17/10
[52] U.S. Cl. ............................................ 384/108; 384/110
[58] Field of Search .................................... 384/108, 110, 384/124, 123, 107

[56] References Cited

U.S. PATENT DOCUMENTS 5,448,120  9/1995  Schaule et al. ........................ 384/110
5,876,124  3/1999  Zang et al. .............................. 384/124

*Primary Examiner*—Lenard A. Footland
*Attorney, Agent, or Firm*—Flehr Hobach Test Albritton & Herbert L.L.P.

[57] ABSTRACT

An improved capillary seal for use with a hydrodynamic bearing is disclosed, which provides a stronger or stiffer seal for a fluid dynamic bearing motor which is open at both ends, and is used with top cover attached motors utilizing fluid dynamic bearings. The design for the seal system actively pushes the oil back into the FDB while it is spinning, combined with the capillary tension which holds oil in the FDB during stationary periods, and allows air, trapped within the seal and the associated FDB, to be expelled, eliminating air bubbles from the fluid dynamic bearing.

17 Claims, 7 Drawing Sheets

ASYMMETRIC SEALING MEANS FOR FLUID DYNAMIC BEARINGS

CROSS-REFERENCE TO RELATED APPLICATION

This invention is based on U.S. Provisional patent application, Ser. No. 60/064,590, filed Nov. 6, 1997, assigned to the assignee of this application and incorporated herein by reference. This application is also a continuation-in-part of U.S. application Ser. No. 08/994,099 filed Dec. 19, 1997, entitled "SIMPLIFIED CONICAL BEARING WITH INDEPENDENT FLOW PATHS" incorporated herein by reference.

The subject invention is especially useful in motors of the type described in U.S. patent application, Ser. No. 09/060,225 filed, Apr. 14, 1998, entitled "IN-HUB SPINDLE MOTOR WITH SEPARATE FLUID DYNAMIC BEARINGS" the invention makes use of the grooved pumping seal disclosed in U.S. patent application, Ser. No. 09/060,342, filed Apr. 14, 1998, entitled "Grooved Pumping Seal"; and the centrifugal capillary seal disclosed in U.S. patent application, Ser. No. 09/060,328, filed Apr. 14, 1998, entitled "CENTRIFUGAL CAPILLARY SEAL FOR USE WITH FLUID DYNAMIC BEARINGS" both filed contemporaneously herewith, assigned to the assignee of this application and incorporated herein by reference.

FIELD OF THE INVENTION

The present invention relates to fluid dynamic bearings, and more specifically, the present invention relates to a seal system for retaining fluid and purging air from a hydrodynamic fluid bearing, especially as they are used in disc drive storage systems.

BACKGROUND OF THE INVENTION

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has led to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair of races which allow a hub of a storage disc to rotate relative to a fixed member. However, ball bearing assemblies have many mechanical problems such as wear, run-out and manufacturing difficulties. Moreover, resistance to operating shock and vibration is poor, because of low damping. Thus, there has been a search for alternative bearing assemblies for use with high density magnetic storage discs.

One alternative bearing design which has been investigated is a hydrodynamic bearing. In a hydrodynamic bearing, a lubricating fluid such as gas or a liquid provides a bearing surface between a fixed member of the housing and a rotating member of the disc hub. Typical lubricants include oil or ferromagnetic fluids. Hydrodynamic bearings spread the bearing interface over a large continuous surface area in comparison with a ball bearing assembly, which comprises a series of point interfaces. This is desirable because the increased bearing surface reduces wobble or run-out between the rotating and fixed members Further, improved shock resistance and ruggedness is achieved with a hydrodynamic bearing. Also, the use of fluid in the interface area imparts damping effects to the bearing which helps to reduce non-repetitive runout.

However, some hydrodynamic bearing designs themselves suffer from disadvantages, including a low stiffless-to-power ratio and increased sensitivity of the bearing to external loads or shock.

A desirable solution to this problem would be to have the spindle motor attached to both the base and the top cover of the disc drive housing. This would increase overall drive performance. A motor attached at both ends is significantly stiffer than one held by only one end.

Typically, hydrodynamic motor designs provide no method for top cover attachment. The reason for this is that in order to have top cover attachment, the motor (i.e. the fluid bearing which separates the fixed and moving parts) would need to be opened on both ends. Opening a motor at both ends greatly increases the risk of oil leakage out of the hydrodynamic bearing. This leakage among other things is caused by small differences in net flow rate created by differing pumping pressures in the bearing. If all of the flows and pressures within the bearing are not carefully balanced, a net pressure rise toward one or both ends may force fluid out through the capillary seal. Balancing the flow rates and pressures in conventional, known fluid bearing designs is difficult because the flow rates created by the pumping grooves are a function of the gaps defined in the hydrodynamic bearing, and the gaps, in turn, are a function of parts tolerances. Thus, a need exists for a new approach to the design of a hydrodynamic bearing based motor and especially the seals used to retain fluid in the motor.

As presently designed, fluid dynamic bearing motors seal the open end, whether it is just one end or both ends, using a capillary seal which simply comprises two relatively angled surfaces at the end of the gap with the seal being formed from one angled surface to the other. The problem with such conventional capillary seals is that they depend entirely on surface tension to maintain or draw fluid back into the motor. When used in pairs, as in a motor having an FDB which is open at both ends, such as a top cover attached motor, such a pair of capillary seals can be categorized as a pull-pull system. When there is more oil in one end than the other, the capillary seal with the lesser amount of oil pulls harder than the opposing capillary seal, and restores equilibrium. However, such capillary seals have been shown to be quite weak. For example, in one known configuration, which has been tested, a pair of capillary seals has a restoring stiffness about 580 Pa/mm. or 0.006 atm/mm. The problem with this low stiffness in a motor open at two ends is that only a small pressure imbalance in the motor can overcome the low seal stiffness, and cause oil to be lost.

SUMMARY OF THE INVENTION

It is an object of the present invention to create an improved sealing system for use with a hydrodynamic bearing.

More specifically, it is an objective to provide a stronger or stiffer seal for a fluid dynamic bearing motor which is open at both ends.

A further and related objective of the invention is to provide an improved seal system for use with top cover attached motors utilizing fluid dynamic bearings.

Another objective of the invention is to establish active dynamic sealing on both axial ends of a hydrodynamic bearing so that fluid is actively maintained within the bearing.

Yet another objective is to provide sealing means on either side of an FDB which actively establish pressure gradients on either side of the FDB which actively retain the fluid within the bearing when the bearing is spinning, i.e. relative rotation is established between the two bearing walls.

Another objective of the invention is to provide a FDB with a variable or tapered gap which may be used alone or in combination with an imbalanced groove pattern to establish a pressure gradient along the face of the bearing gap; this pressure gradient may be used alone or in combination with the pressure gradients of one or both of the asymmetric sealing means to retain fluid in the bearing and expel air bubbles.

Yet another objective of the invention is to achieve a design for a seal system which utilizes actively pushes the oil back into the FDB while it is spinning; a further objective is to provide this benefit combined with the use of capillary tension which holds oil in the FDB during stationary periods.

Yet another objective of the invention is to achieve a seal design which allows air, trapped within the seal and the associated FDB, to be expelled, eliminating air bubbles from the fluid dynamic bearing.

These and other objectives of the present invention are achieved by providing a sealing system useful especially useful in a hydrodynamic bearing which is open at both ends, the hydrodynamic bearing being incorporated in a bearing cartridge which in turn may be incorporated into a spindle motor or the like. The hydrodynamic bearing includes a shaft and two independent bearings, comprising a top cone or bisphere and a bottom cone or bisphere separated by a segment of the shaft. In a preferred embodiment of the invention, a centrifugal capillary seal is incorporated between each bearing cone and the open end of the shaft, which utilizes centrifugal force to push oil back into the fluid bearing while it is spinning, and capillary tension to hold oil in the fluid bearing during stationary periods. The sealing is a push-push type of sealing, which provides according to one calculation 4 times the stiffness of a conventional capillary seal. It can therefore retain oil within the system with greater pressure imbalances.

In an especially preferred embodiment of the invention, an asymmetric sealing system and method is employed on either side of each hydrodynamic bearing. This asymmetric sealing technique incorporates, in addition to the above centrifugal capillary seal, a grooved pumping seal on the opposite side of each fluid dynamic bearing from the centrifugal capillary seal and between the fluid dynamic bearing and a central portion of the shaft. This grooved pumping seal is a seal formed between a sleeve and the shaft, with pumping grooves being defined on at least part of the seal or shaft. These pumping grooves retain bearing fluid within the grooved pattern when the sleeve and shaft are stationary; when the parts are relatively rotating, the oil is pumped into a region which has very shallow or no grooves, dramatically enhancing the sealing stiffness of the sealing system. By one measurement, this grooved pumping seal is over 60 times stiffer than the centrifugal capillary seal which is on the opposite side of the fluid dynamic bearing.

In a further advantageous portion of this design, the surface of the fluid dynamic bearing uses a grooving pattern and, in some embodiments, a varying gap width which varies over the bearing surface with distance from the outer end of the shaft toward the center of the shaft to provide a slightly unbalanced pressure distribution which is greater toward the center of the shaft. Thus the fluid flow is in the direction from the centrifugal capillary seal to the grooved pumping seal; this is accomplished even with variations in manufacturing tolerances in parts and assembly. By establishing this pressure distribution over the surface of the fluid bearing, air bubbles are pushed to the apex of the bearing cone or bisphere and are expelled through the centrifugal capillary seal.

Other features and advantages of the present invention will become apparent to a person of skill in the art who studies the following invention disclosure which is given with respect to the following figures.

DETAILED DESCRIPTION OF A PREFERRED EMBODIMENT

Figure 1:
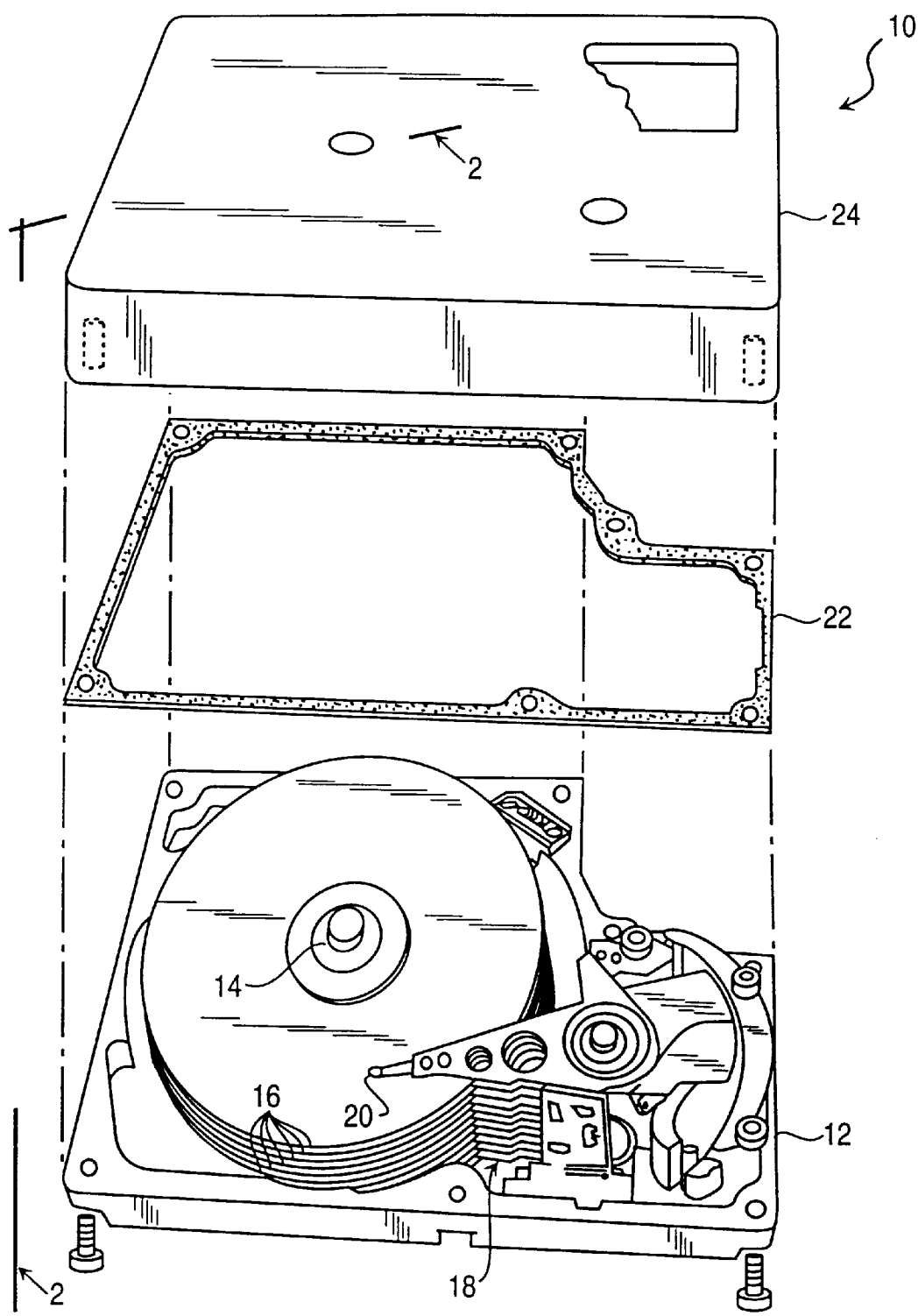
FIG. 1 is a top plan view of a disc drive in which the present invention is useful.

FIG. 1 is an exploded perspective view of a magnetic disc drive storage system in which the present hydrodynamic bearing cartridge could be used. In the example to be discussed below, the use of the hydrodynamic bearing and associated cartridge will be shown in conjunction with a spindle motor. Clearly, this bearing and seal design is not limited to use with this particular design of a disc drive, which is shown only for purposes of the example. Given the stability and fluid sealing and air expulsion characteristics which this invention achieves, it could also have numerous other uses outside the field of disc drives. In fact, the seal could easily be used on a bearing where the shaft rotates and a surrounding wall or sleeve is fixed, or in any system where relative rotation between shaft and sleeve occurs (even if both rotate in the same direction).

In this particular example, the storage system 10 includes a housing base 12 having spindle motor 14 which carries storage discs 16 for rotation. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain each transducer flying over the surface of the associated disc. In present day technology, the spacing distance between the transducer and the rotating disc surface is measured in microinches; thus it is absolutely essential that the disc does not tilt or wobble. Thus, a highly stable FDB to support the hub of motor 14 for rotation about the shaft is essential.

The present invention will next be described with respect to the following figures. Details of several of the structural elements which appear herein can also be found by referring to the cited co-pending patent applications which are incorporated herein by reference. The seal system is shown incorporated into an exemplary type of spindle motor which appears in FIGS. 2A and 2B. Obviously, the seal system taught herein can be used with many types of motors supported by hydrodynamic bearings, whether open at one or two ends. Also, as will be discussed, other combinations of the centrifugal capillary seal and grooved pumping seal can be used in a FDB or FDB cartridge, depending on the operating environment. A fixed shaft design appears in FIGS. 2 and 4; use of this invention in rotating shaft designs could also be readily achieved.

Figure 2A:
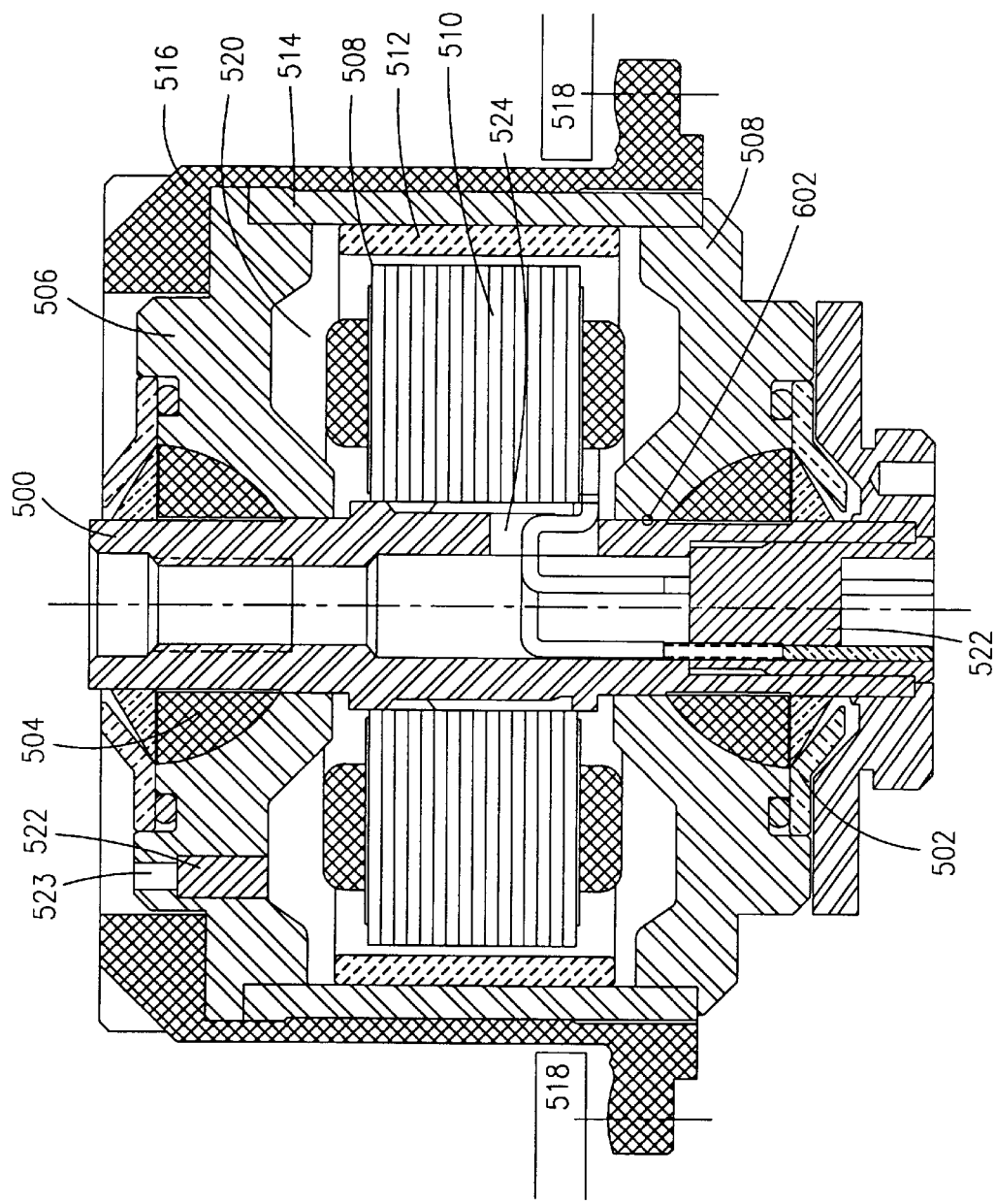
FIG. 2A is a vertical sectional view of a motor in which the asymmetrical sealing means is useful.
Figure 2B:
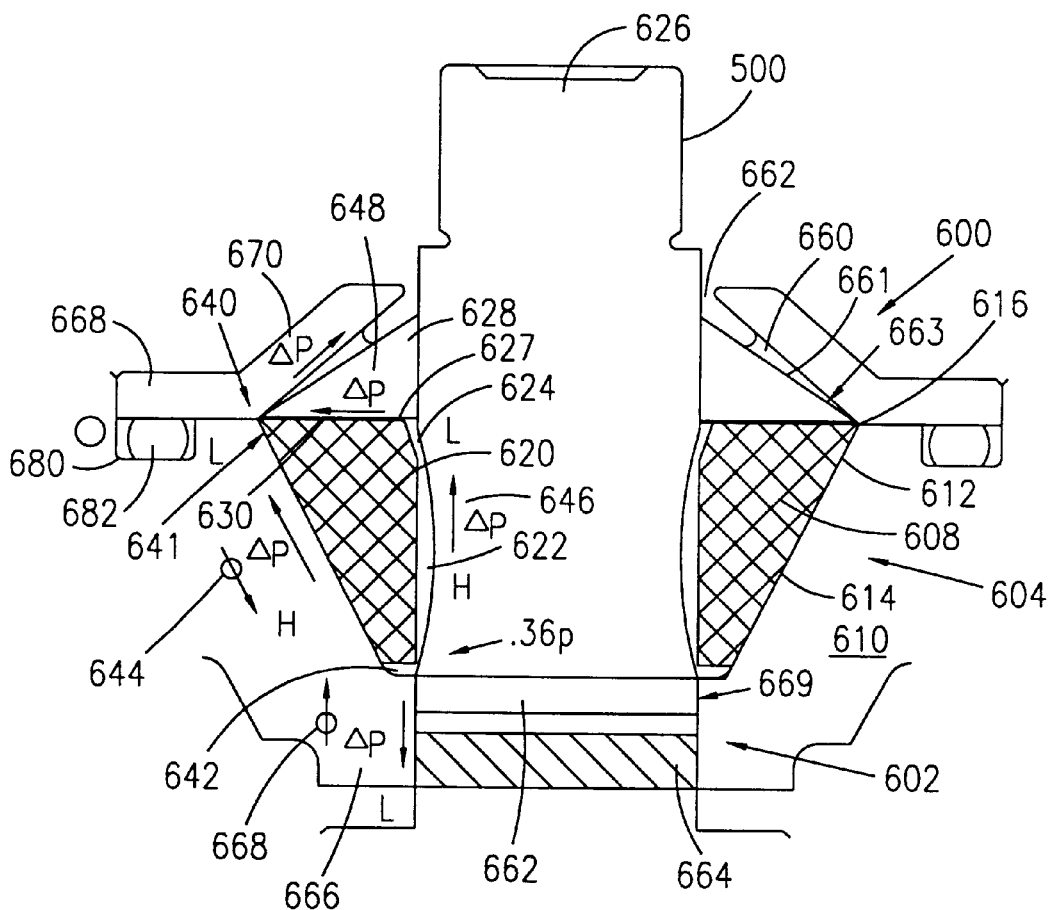
FIG. 2B is a more detailed sectional view of the asymmetrical sealing means, showing the pressure distribution in the system.
Figure 2C:
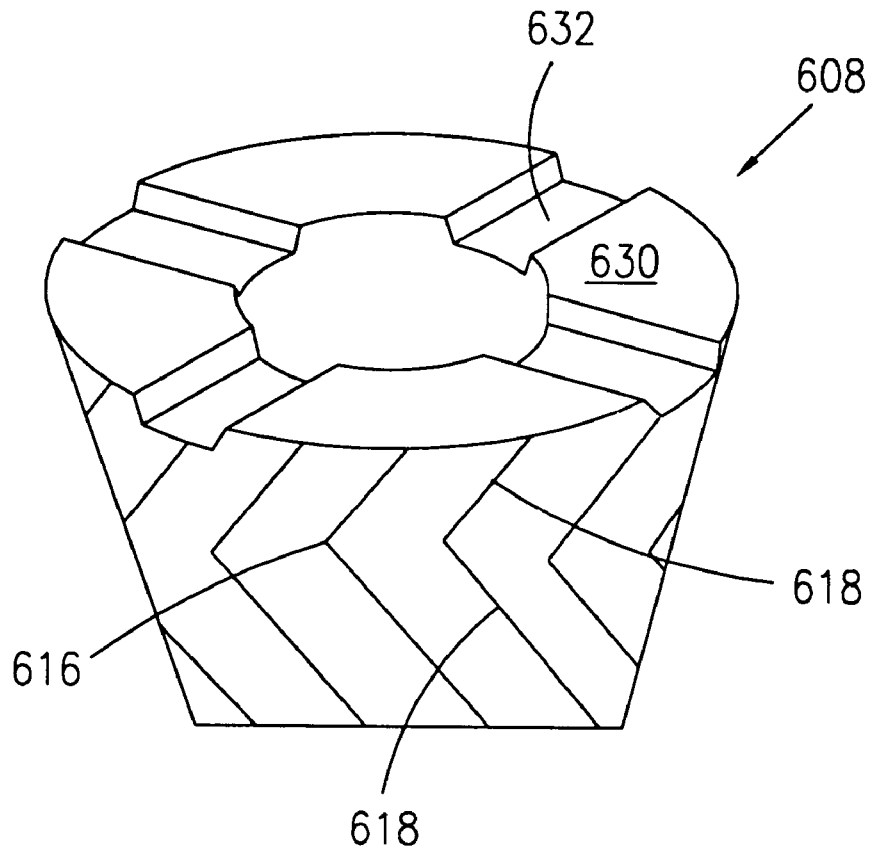
FIG. 2C is a perspective view of the bearing core used in the FDB.
Figure 2D:
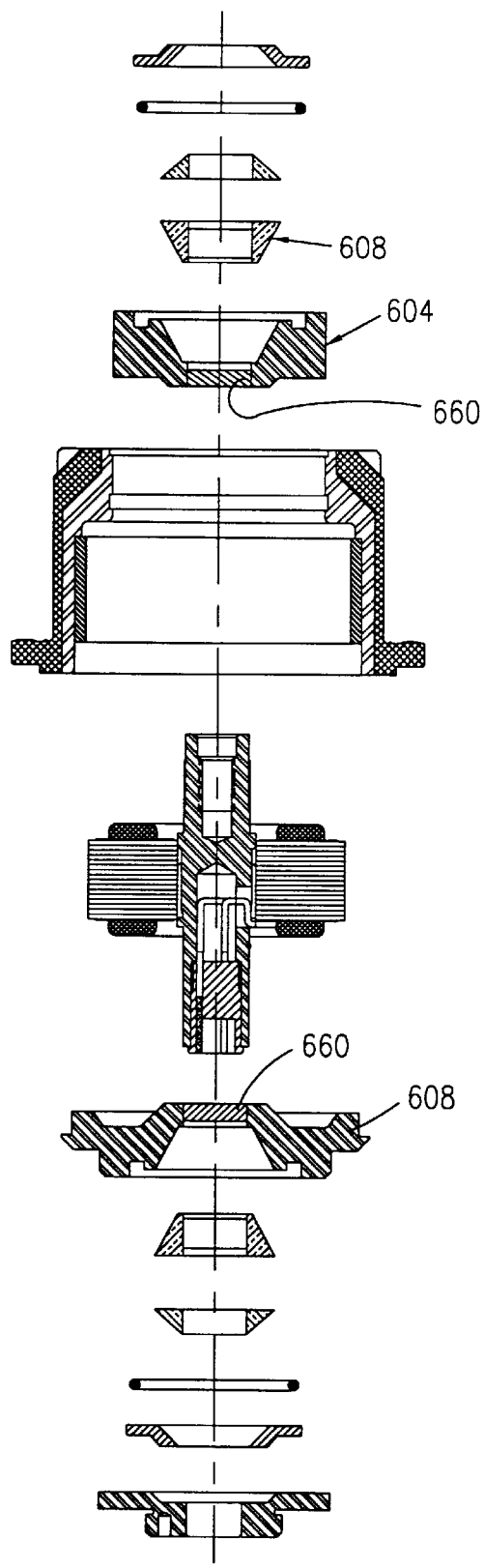
FIG. 2D is an exploded view of the motor.

The incorporation of this centrifugal capillary seal of this invention will now be shown with respect to FIGS. 2A and 2B. In FIGS. 2A and 2B, a centrifugal capillary seal mounted between the hydrodynamic bearing and the end of the shaft is shown used in combination with a groove pumping seal mounted on the opposite side of the bearing cone to form the sealing system. However, a simple capillary seal or other sealing means could be provided on the opposite side of the FDB from either the capillary seal or grooved pumping seal and a useful design would be achieved. Further, a pair of the centrifugal capillary seals or grooved pumping seals could be used at opposite ends of the shaft to seal an open-at-both-ends type of bearing in a motor incorporating a simple shaft and sleeve connecting combination directly two fluid dynamic bearings.

Referring to FIG. 2A, a fixed shaft 500 supports spherical or conical bearings 502, 504 near the opposite ends of the shaft. The central section 508 of the shaft directly supports a stator 510 which cooperates with a magnet 512. The stator mounting, with its inner dimension generally aligned between the FDBs, provides a narrow profile for this in-hub motor. The magnet 512 is supported from a back iron 514 on the interior surface of hub 516 so that energization of the stator 510 causes rotation of the hub and the disc or discs 518 supported thereon. It can be seen that the bearing seats 506, 508 extend radially from the shaft out beyond the radial dimension of the shaft supported stator 510 and support the back iron 514 and the hub 516. This defines an enclosed space 520 for the stator and magnet, enclosing a possible source of contaminants. A pressure equalizing filter 522 is incorporated into at least one of the bearing seats 506. The filter extends at least part way through an opening 523 which extends entirely through the bearing seat 506 so that no contaminants generated within space 520 can escape. Defining this enclosed space also allows implementation of a vacuum filling technique as disclosed in one of the incorporated applications.

This motor is open at both ends, presenting the problem of easily filling the fluid dynamic bearings 502, 504 with bearing fluid, and thereafter preventing the escape of any such fluid; this invention provides means for addressing this problem. This invention also addresses the problem which is posed by the fact that air can sometimes become entrapped in the fluid, reducing the effectiveness of the fluid dynamic bearing. Therefore, the present invention provides means for expelling the air from the fluid dynamic bearing, so that the effectiveness and lifetime of the bearings are optimized.

Thus, referring next to FIG. 2B, the sealing design shown results from the need to providing a very positive sealing means for fluid dynamic bearing motors which have two independent fluid dynamic bearings. Of course, the design of FIG. 2B and its alternatives could be used with other motors wherever two independent fluid dynamic bearings are used. The significance of the design, among others, is that it does not require a close balance of pressure between the top and bottom of the bearing. Further, the centrifugal capillary seal (used alone or in combination with the groove pattern and gap spacing of the FDB which establish a pressure gradient away from the open end of the shaft and apex of the bearing cone), provides a means for expelling air bubbles from the fluid in the associated hydrodynamic bearing. In addition, by combining the characteristics of the centrifugal capillary seal generally indicated at 600 (which provides a means for pushing fluid toward the fluid bearing when the motor is spinning and for holding the fluid in the gap when the motor is at rest), and the grooved pumping seal generally indicated at 602 (which provides a means for holding and sealing the fluid in the FDB), the fluid is positively maintained within any fluid dynamic bearing located between these seals.

As is already well known, the primary support system in the bearing comprises the bearing cone 608 and the surrounding bearing seat 610 whose faces define a gap filled with fluid which serves as the bearing to allow relative rotation. The faces 612, 614 are separated by gap 616 of about five microns (although this dimension is representative of example only; it may be greater or less depending on the tolerances achieved by parts and assembly methods). Fluid fills this gap 616, and is maintained under pressure within this gap at least when the faces are relatively rotating by grooves 618 on the surface of the shaft cone 608 (shown in FIG. 2C). To allow for fluid circulation, and maintenance of the fluid in the gap 616, the gap is extended over the back surface 620 of the bearing cone 608 by providing flow channels, or grooves 622 running linearly along the back surface of the cone or the facing surface 624 of the shaft. These channels 622 allow the fluid to pass axially toward the distal end 626 of the shaft 500. The path or bearing gap for the fluid is completed through a gap between a wall 627 of the sealing cone 628 and the upper surface 630 of the bearing cone 608. Most efficiently, the path is through flow channels or grooves 632 formed in the top surface 630 of the cone 608 (see the cone detail in FIG. 2C), although the grooves could also be provided in the complementary surface of the sealing cone 628.

As is shown by the arrows marked Ap on FIG. 2B (indicating pressure gradients from high to low pressure), the pumping action of the grooves 618 on the face of the bearing cone 608 create a pressure differential from the apex 640 of the bearing cone toward the narrower end 642 of the cone. Thus, the fluid flow over the surface of the bearing cone 608 being generally from the point of lower to higher pressure, is as marked by the arrow 644 and continues axially toward the distal end 626 of the shaft following the path marked by arrow 646 and returns to the apex of the cone through the grooves 632 following the pressure arrow 648.

Figure 3:
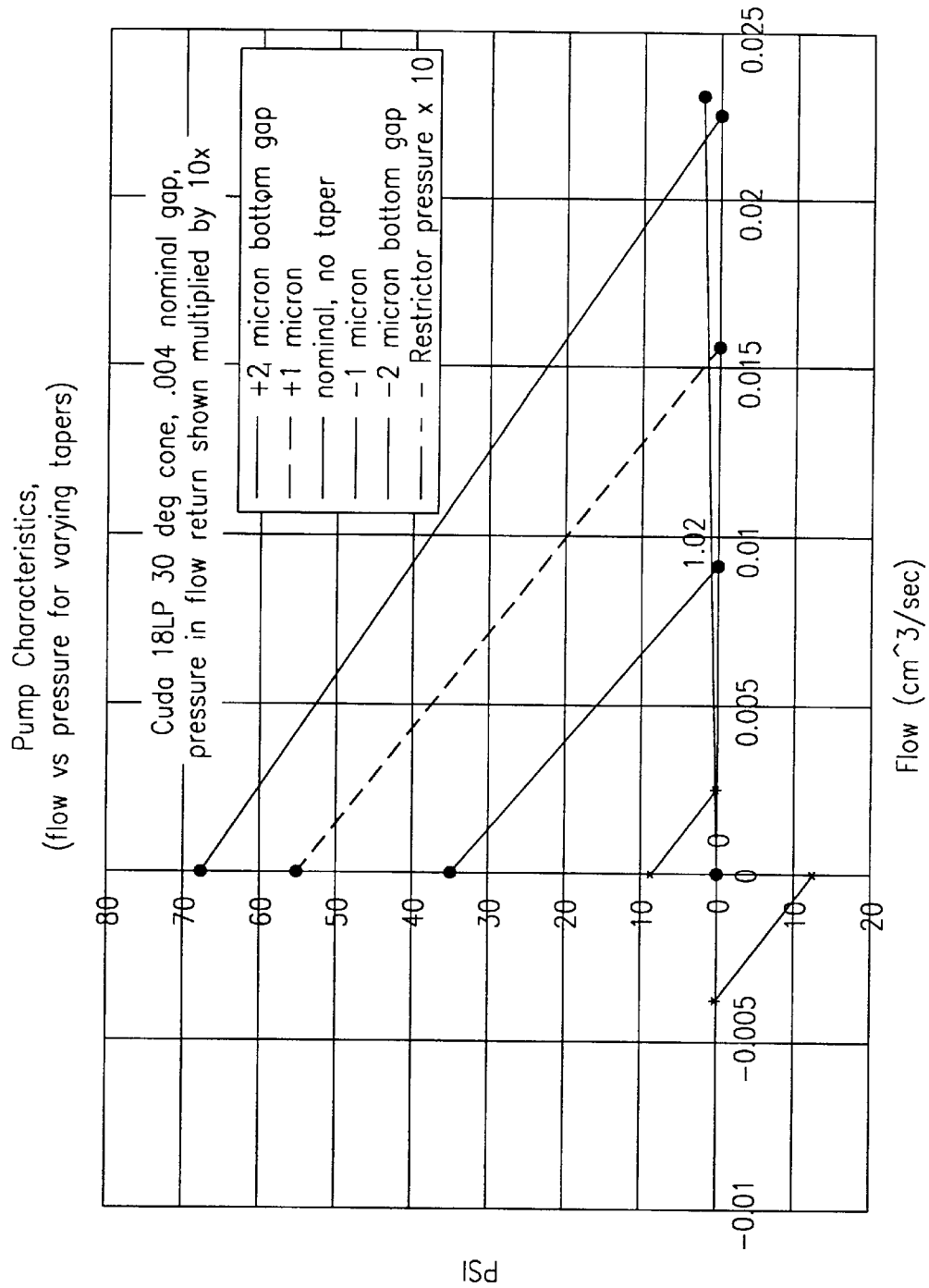
FIG. 3 is a graph of the pumping characteristics of the FDB of FIG. 2A.

In a preferred embodiment, the pressure gradient is maintained in the direction shown even though tolerance variations allow a varying width in the gap 616 between the surface of the cone 608 and the facing surface of the bearing seat 610 which form the fluid dynamic bearing. As shown on the graph which comprises FIG. 3, the highest pumping pressure is achieved by providing a gap increase of 2 microns from the apex 640 at the broad end 641 of the bearing cone to the narrow end 642 of the pumping cone.

The figure demonstrates that by providing this taper of the gap from apex to narrow end of the cone, that the pumping pressure is enhanced, and the ability to expel air bubbles from the system is also further enhanced. At the other tolerance extreme, a decrease of almost 2 microns (from apex 640 to cone narrow end 642) is allowable before the pressure and flow reverse. Reversal should not be allowed.

In order to provide a means for fluid to be inserted into the fluid dynamic bearing, as well as to provide a means for air bubbles to be expelled from the bearing 610, a centrifugal capillary seal 660 is incorporated into the design, leading from the open end 662 of the fixed shaft 500, down to the apex 640, i.e. the common point of the exit of the capillary seal and an end of the fluid dynamic bearing. The seal is formed between a wall 661 of the shield seal 668 which rotates with and is supported from (or even integrated with) bearing seat 506 and hub 516, and wall 663 of seal cone 628 which is supported from the shaft. The substantially radially directed diverging walls 661, 663 are separated by a measurable gap 662 at the axially outer end of the seal; the narrowest point is at or near the apex 640 of the sealed design adjacent the end of the fluid dynamic bearing gap 616. As disclosed in greater detail in the incorporated applications, the centrifugal capillary seal 660 utilizes centrifugal force which is created by the relative rotation of the walls 661, 663 to create a pressure gradient represented by the arrow Δp, 670, to push oil back into the adjacent FDB whenever the motor is spinning. This pressure gradient across the capillary seal can also be used to fill the FDB with oil.

Establishing this combination of pressure gradients in the FDB and adjacent centrifugal capillary seal also provides a means for expelling air bubbles from the entire fluid dynamic bearing system. That is, some air bubbles may appear in the system and have a negative effect on performance. However, by establishing the pressure gradients represented by the various arrows Δp over the surfaces of the bearing cone, and through the capillary seal, the air bubbles can be expelled. Specifically, it is known that when the pressures are established, and the relative rotation has been established, the air bubbles will move from the point of highest pressure to lowest pressure. Therefore, any air bubbles appearing in or near the quiet zone 669 of the groove pumping seal 602 (to be explained below) or near the narrow portion 642 of the bearing cone, or along any surface of the bearing cone will move toward the point of lowest pressure which is the apex 640 of the bearing cone 608 and sealing cone 628. Once reaching that point, the air bubbles will continue to the point of lowest pressure, i.e. moving out through the reservoir of the centrifugal capillary seal and being expelled through the meniscus of the capillary seal. Thus, this system operates to continuously purge itself of any air which might inadvertently enter the system, while very effectively sealing the fluid within the bearing system.

In a preferred embodiment, the pressure gradient is further enhanced by the location of the apex 619 of the herringbone grooves 618 on the surface of the bearing cone 608. The location of groove apex 619 is chosen to ensure an upward pressure gradient along the bearing surface toward the cone apex 640. This must be provided for the range of gaps between the cone 608 and the bearing seat 610. The herringbone grooves could also be located in the bearing seat 610. As shown on the graph which comprises FIG. 3, the highest pumping pressure is achieved when tolerances result in a taper increase of 2 microns from the apex of the bearing cone to the narrow end of the pumping cone. Thus, it is established that this taper effect of the gap from apex to narrow end of the cone, that the pumping pressure is enhanced, and the ability to expel air bubbles from the system is also further enhanced. The opposite is true when the taper causes the gap to be the largest at the cone apex 640.

In order to further enhance the sealing stiffness of the system, a grooved pumping seal 602 is provided, typically and preferably immediately axially inward from base 642 of the bearing cone, between the bearing cone and the central portion of the shaft where the stator is mounted. This grooved pumping seal 602, in a preferred form, can be defined on the face of a central section 669 of the bearing seat 610 which also supports the outer one 616 of the two faces 614, 616 of the fluid dynamic bearing 604.

In a preferred form, this grooved pumping seal 602 comprises a first ungrooved surface section or quiet zone 662 surrounding a portion of the ungrooved shaft immediately adjacent the base 642 of the bearing cone, and a second grooved pumping region 664 which also closely surrounds an ungrooved section of the shaft immediately adjacent the quiet zone 662. This grooved pumping seal 602 is intended to be a low volume, very high stiffness seal. It is a capillary seal which employs active pumping by virtue of the presence of relatively deep grooves in one section 664 of the seal. When the shaft is at rest, the oil settles into the grooves but cannot pass further down the shaft toward the center of the motor because of the capillary effect of the grooves and shaft to seal gap. When the motor spins up, the relative rotation of the shaft 500 and the surrounding section 664 of the grooved pumping seal create the pressure gradient indicated by the arrow Δp, 666. This causes an oil fluid flow out of the grooves into the quiet zone 660 as indicated by the arrow 668. Because of the narrow gap in this quiet zone 660 between the smooth seal surface 662 and the smooth surface of the shaft, a substantial sealing stiffness adjacent the FDB bearing is created; sealing stiffness is defined as the change in pressure across the seal divided by the length of the seal; it represents the ability of the seal to retain fluid in the adjacent FDB. In the grooved pumping seal, because of this quiet zone, there is little pumping action to force the oil out of the grooved pumping seal into the fluid dynamic bearing, but a very strong boundary condition is established adjacent the FDB. Since the pressure gradient is strongly toward the FDB, fluid cannot escape the FDB, maintaining the fluid level. As explained above, any air bubbles which appear in the quiet zone would tend to move contrary to the pressure gradients in the fluid dynamic bearing and be expelled from the distal end of the shaft through the centrifugal capillary seal; any further air bubbles which moved into the grooves of the groove section 664 could be expelled into the interior section of the motor because of the strong pressure gradient created by the rotation of the grooved pumping seal.

Finally, it should be noted that it is strongly preferred that the depth of the grooves and/or the width of the grooves diminishes as the oil is moved up through the grooved pumping zones 664 into the quiet zone 660. This enhances and provides a means for pumping the oil efficiently out of the grooves into the quiet zone during motor operation without ingesting air, while providing a strong capillary effect in the grooves to maintain the oil in the grooved pumping seal 602 when the motor is not in operation.

It should be further noted that although the preferred embodiment of this design discloses utilizing grooves on the central section of the bearing seat, a separate grooved piece could be provided separate and apart from the bearing seat; and in a further alternative, that the central section of the bearing seat which surrounds the shaft could be left entirely smooth, and the grooves instead imposed upon the shaft.

In summary, this asymmetrical seal design comprises three different elements: a centrifugal capillary seal (CCS), a grooved pumping seal (GPS) on the opposite side of the bearing which opposes the centrifugal capillary seal, and a herringbone groove geometry on the cone which is balanced to pump fluid away from the CCS towards the GPS. Two actions are taking place as a result of this design: sealing, and air bubble purging. Sealing is accomplished with the two different kinds of seals. The CCS is a low stiffness, high volume seal. The GPS is a high stiffness, low volume seal. The stiffness of the seal is a measurement of its pressure change/unit fluid displacement, i.e., Pa/mm. For the design shown, the shaft diameter is 3.75 mm. The stiffnesses are: centrifugal capillary seal (2343 Pa/mm at 7200 RPM for a pair); grooved pumping seal (1.45×105 Pa/mm); double capillary seal (536 Pa/mm for a pair). The stiffness or the $$\frac{dp}{dr} = prw^2$$

or the stiffness ratios are:

GPS/capillary=270 to 1

GPS/CCS=60 to 1

CCS/Capillary=4 to 1

Although conventional capillary seals are not shown in this disclosure, they are used for comparison. The stiffness shown for the GPS is based on:

1.5 mm length or seal

25° groove angle seal gap=0.0005"=0.013 mm

50% land to groove ratio volume of oil is 0.23 $\mu l$

The CCS has a volume of oil of≈1,7 $\mu l$ or 7.4 times that of the GPS. The GPS would actually have a non-grooved, or quiet zone which would prevent all oil from being pumped out of the seal. The CCS can easily accommodate all the oil in the GPS. The GPS ensures that no oil is ejected into the motor, while the CCS serves as both a reservoir and a seal.

The CCS utilizes centrifugal force to push oil back into the motor. This is what makes it so much stiffer than a conventional capillary seal. The capillary (diverging shape) of the CCS allows oil to be sucked into the motor without using a vacuum system. The gap sizes in the seal draw in oil. This has been demonstrated experimentally. This design allows a dual bearing motor to be oil filled without a vacuum chamber.

Figure 4:
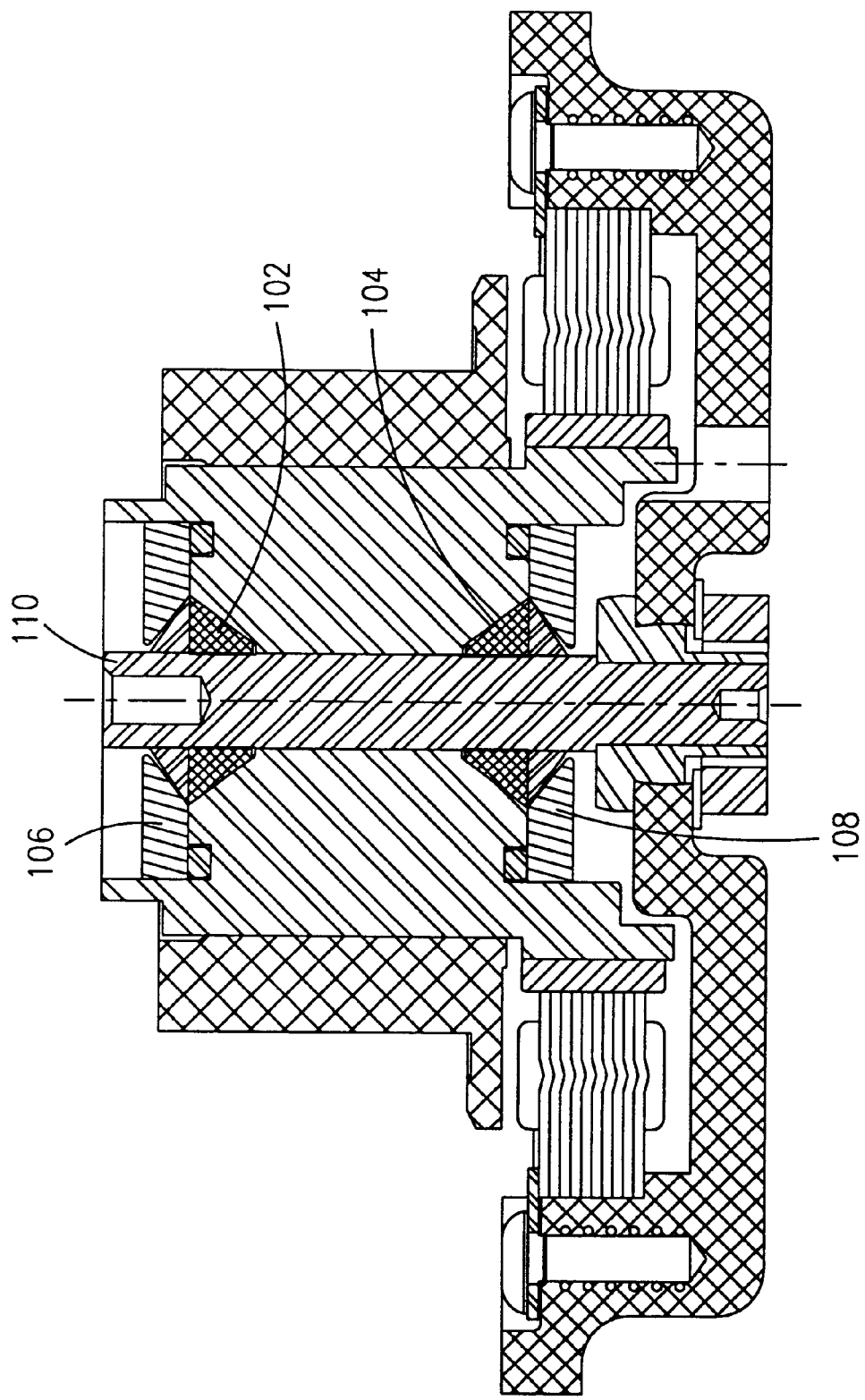
FIG. 4 is a schematic diagram of an alternative embodiment of the invention.

Finally, referring to FIG. 4, this figure schematically indicates that the invention contemplates other pairings of the centrifugal capillary seal and grooved pumping seal than shown in the embodiment of FIG. 2A. For example, where two spherical or conical bearings 102, 104 are supported on opposite ends of a common shaft, the bearing fluid could be maintained and air expelled simply by using a centrifugal capillary seal 106, 108 at each outer, open end of the shaft 110. This is especially useful where the central section of the shaft does not have to be deprived of bearing fluid. A further alternative, which provides an even stiffer system, although it may not be as successful at expulsion of the air, would substitute a grooved pumping seal for each of the centrifugal capillary seals 106, 108.

Other features and advantages of the present invention will become apparent to a person of skill in the art who studies the present invention disclosure. Therefore, the scope of this invention is to be limited only by the following claims.

What is claimed is:

1. An asymmetric sealing system for use in combination with a hydrodynamic bearing wherein said hydrodynamic bearing comprises a cone or sphere mounted near an end of a shaft and defining in cooperation with a bearing seat having a surface facing an outer surface of said hydrodynamic bearing a fluid bearing gap, said sealing system comprising first sealing means for establishing a higher pressure from a distal end of said shaft toward said gap of said hydrodynamic bearing, and a second sealing means on an opposite side of said hydrodynamic bearing from said first sealing means for establishing a positive, higher pressure toward said hydrodynamic bearing gap, the pressure is established by said first and second sealing means maintaining the fluid in said gap during relative rotation of said surfaces of said hydrodynamic bearing.

2. An asymmetric sealing system as claimed in claim 1 wherein said first sealing means comprises a centrifugal capillary seal comprising a reservoir defined by a pair of relatively diverging generally radial walls having a gap which narrows from said distal end of said shaft toward said hydrodynamic bearing to create said pressure gradient from said wider gap towards said narrower gap.

3. An asymmetric sealing system as claimed in claim 2 wherein said reservoir is at least partially filled with fluid, and a meniscus is formed across said fluid to protect said fluid from leaving said reservoir.

4. An asymmetric sealing system as claimed in claim 2 wherein said radial wall of said moving element continues into a generally axially extending wall which diverges from an axial wall of said shaft to form said meniscus of said capillary seal.

5. An asymmetric sealing system as claimed in claim 2 wherein said bearing cone includes flow passages defined between said bearing cone and said shaft communicating with a passage along a radial wall of said bearing cone to allow said fluid to circulate around said bearing cone.

6. An asymmetric sealing system as claimed in claim 5 wherein said flow passages between said cone and said shaft are defined by grooves in a rear surface of said bearing cone.

7. An asymmetric sealing system as claimed in claim 2 including a top seal plate affixed to an outer surface of said shaft and cooperating with said generally radial surface of said bearing cone to define one of said walls of said reservoir of said capillary seal, a meniscus being formed from an opposite wall of said reservoir to a facing surface of said seal plate.

8. An asymmetric sealing system as claimed in claim 2 including a sealing cone affixed to an outer surface of said shaft and having a acute angled surface defining one of said radial walls of said reservoir, said reservoir being defined between said acute angled walls of said sealing cone and an acute angled wall of said hub, said acute angled walls tapering together toward an apex of said sealing cone.

9. An asymmetric sealing system as claimed in claim 8 wherein said reservoir is in fluid communication with a gap of said hydrodynamic bearing at said apex.

10. An asymmetric sealing system as claimed in claim 8 wherein said sealing cone further includes a generally radial surface facing said radial surface of said bearing cone and defining a gap therewith in communication with said gap of said hydrodynamic bearing.

11. An asymmetric sealing system as claimed in claim 10 wherein rotation of said hub relative to said sealing cone creates pressure due to centrifugal force on bearing fluid in said reservoir to force said fluid toward a common apex of said sealing cone and said bearing cone whereby said fluid is maintained within said reservoir.

12. An asymmetric sealing system as claimed in claim 11 wherein one of said complementary surfaces of said bearing cone and said relatively rotating element has grooves thereon to create pressure away from said apex of said bearing cone toward a narrow end of said bearing cone, air bubbles which appear in said fluid moving against said pressure to said apex of said bearing cone and through said reservoir to an open end of said reservoir.

13. A asymmetric sealing system as claimed in claim 2 wherein said herringbone pattern comprises means for establishing said pressure gradient from said first sealing means toward said second sealing means in said hydrodynamic bearing.

14. A asymmetric sealing system as claimed in claim 1 wherein said second sealing means comprises first and second adjacent region formed on a portion of a sleeve-like element surrounding said shaft adjacent said hydrodynamic bearing, said first region being relatively wider in an axial dimension than said second region and comprising means for storing fluid when said shaft and said sleeve-like surrounding region are at rest, said second region comprising means cooperating with said first region for establisling sealing stiffness adjacent said hydrodynamic bearing when said shaft and said sleeve-like element are in relative rotational motion.

15. An asymmetric sealing system as claimed in claim 14 wherein said first region comprises closely spaced substantially horizontal grooves capable of retaining said fluid when said sleeve is at rest and for pumping said fluid into said second region when said sleeve is rotating relative to said shaft.

16. An asymmetric sealing system as claimed in claim 15 wherein said second region is an ungrooved region closely spaced from said shaft so that fluid between said shaft and said sleeve establishes substantial stiffness between said shaft and said sleeve.

17. An asymmetric sealing system as claimed in claim 16 wherein the ratio of the axial length of said first region to the axial length of said second region is about 3:1.

* * * * *